Aug. 31, 1965 G. KIRSCHEY 3,203,280
CONTINUOUSLY CONTROLLABLE FRICTION WHEEL GEAR DRIVE
Filed Aug. 8, 1963

INVENTOR
Gerhard Kirschey
By Ernest Montague
Attorney

Aug. 31, 1965 G. KIRSCHEY 3,203,280
CONTINUOUSLY CONTROLLABLE FRICTION WHEEL GEAR DRIVE
Filed Aug. 8, 1963 2 Sheets-Sheet 2

INVENTOR
Gerhard Kirschey
BY Ernest G. Montague
Attorney

United States Patent Office 3,203,280
Patented Aug. 31, 1965

3,203,280
CONTINUOUSLY CONTROLLABLE FRICTION
WHEEL GEAR DRIVE
Gerhard Kirschey, Baumhof 12, Wuppertal-
Barmen, Germany
Filed Aug. 8, 1963, Ser. No. 300,851
Claims priority, application Germany, June 19, 1963,
K 50,000
4 Claims. (Cl. 74—796)

The present invention relates to a continuously controllable friction wheel gear drive with an inner sun consisting of at least two inner rings which are freely adjustable in axial direction on a bushing or on a drive shaft, and with an outer sun consisting likewise of at least two outer rings. One of the rings of the outer sun is immovably mounted in a housing, and the other of the rings is axially adjustable. The gear drive has additionally flat circulating or planet gears forming a double cone, the gears engaging the inner rings constituting the inner sun as well as the outer rings constituting the outer sun, and the gears being furthermore mounted adjustably in radial direction in a driven disk coupled with a portion of a driven shaft.

In friction wheel gear drives of the type set forth above, it is known to adjust radially the planet gears according to the required output drive speed by adjustment of the rings constituting the outer sun, whereby the conical faces of the planet gears are pressed more or less deeply between the gripping flanges of the rings constituting the inner sun as well as the outer sun, which rings in turn exert an axially directed force upon the planet gears, which force can be produced, for instance, by means of a moment coupling disposed before the inner sun.

In such gear drives, the transferable output efficiency depends substantially upon the force producing the friction. It has been found from extensive practical experience and numerous tests that the friction value at the output transmitting friction points varies extensively with the different control positions of the gear drive. Therefore, the produced force must be varied accordingly at the different control positions of the gear drive in order to transmit safely, on the one hand, the desired output and, on the other hand, not to drive the force to an undesirably high level in order to avoid an unnecessary output loss and an undesirable wear. Such variable production of the force can be effected, for instance, by a moment coupling with a correspondingly changing inclination of the inclined engaging faces. Such moment couplings have also proved well, however, they are cumbersome and expensive in their production.

It is therefore one object of the present invention to provide a continuously controllable friction wheel gear drive which comprises a very simple and economic design, preferably for gear drives with a very small output. For these small gear drives it is important that they are of a very simple design in order not to make them cumbersome. A simple substitution for the expensive moment coupling is an arrangement of springs therefor.

It is another object of the present invention to provide a continuously controllable friction wheel gear drive wherein the rings of the inner sun of the gear drive are pressed together by at least one pre-tensioned spring with a descending characteristic curve, the start of the working area of the spring being disposed near the summit ($P_{max}$) of the characteristic curve of the spring.

Springs with an ascending characteristic curve, regardless whether this characteristic curve is linearly, progressively or even degressively ascending, bring about an unfavorable output performance of the gear drive, since the engagement force is too high, thereby, over one part of the adjustment area—with the corresponding undesirable accompanying occurrences—while over another part of the adjustment area the engagement force is too low to enable the transfer of the desired output. Yet, by the use of correctly positioned springs with a descending characteristic a proper transmission of the output and a correct magnitude of the forces in the total adjustment area of the gear drive is achieved.

It is still another object of the present invention to provide a continuously controllable friction wheel gear drive wherein the spring producing an axial force is forced, by example, by at least one single spring blade in which the ratio of the height of the spring blade to the wall thickness $s$ is greater than the square root of 2, $(h/s > \sqrt{2})$.

The use of a spring, especially a spring blade, with descending characteristic curve for the production of the axially directed force of the rings of the inner sun brings about advantages for the practice concerning its structure, as well as concerning its manufacture, and in such manner that it is now possible to make particularly practical a friction wheel gear drive, which in addition, however, works reliably according to the requirements. Even if the advantages of an axially directed force by means of a spring blade are obtained approximately only, nevertheless, the blade spring suffices to produce the engagement force according to the requirements in gear drives with only small outputs.

Technically, the important feature resides in the fact that the ascending part of the characteristic curve of the spring blade used in this device is removed by providing a pre-tension thereof during the mounting of the spring blade so that only the descending part of the characteristic curve of the spring blade starting at the summit of its characteristic curve is applied as actual working area of the spring. Thus a replacement of the known bolt coupling operating as a moment coupling by a spring blade, which moment coupling is used particularly in gear drives of high output, makes it possible to produce the required axial engagement force reliably with constructively simple means.

The spring force exerted by the spring blade is short-circuited through the bushing or through the shaft so that the axially directed engagement force is equally distributed to both rings of the inner sun. Thus the planet gears can be engaged with a force variable over the adjustment range.

It is still another object of the present invention to provide a continuously controllable friction wheel gear drive wherein the ratio of the highest spring force ($P_{max}$) to the lowest spring force ($P_{min}$) in the working range of the spring is about 1.4:1.

With these and other objects in view, which will become apparent in the following detailed description, the present invention will be clearly understood in connection with the accompanying drawings, in which.

Figure 1:
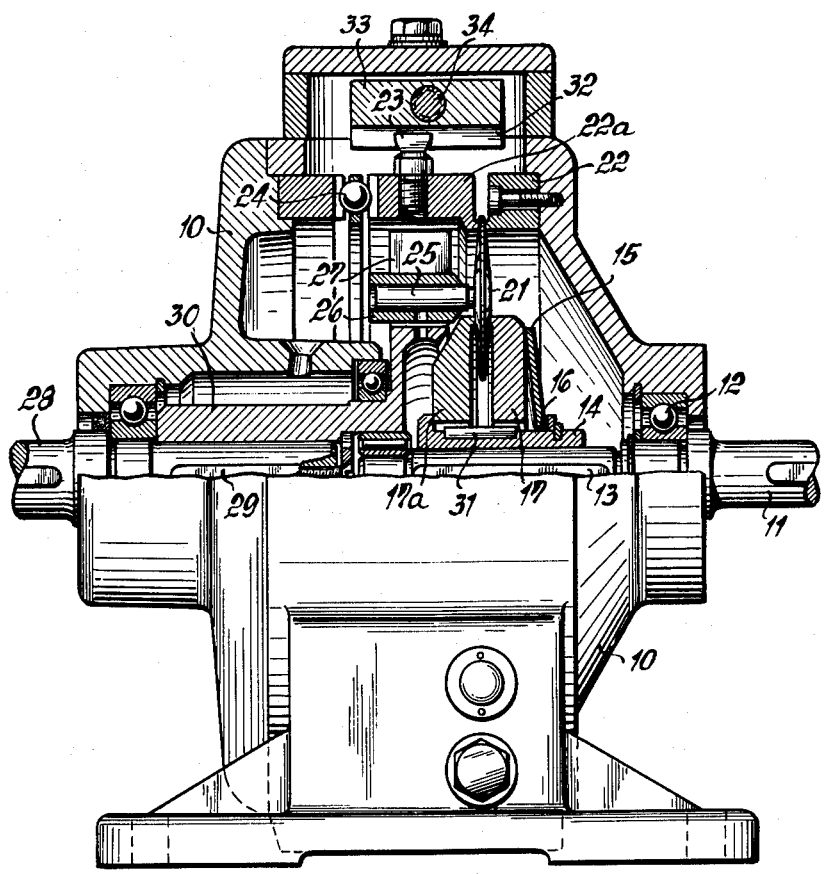
FIGURE 1 is an elevation, partly in section, of a friction wheel gear drive.

Referring now to the drawings, and in particular to FIG. 1, the gear drive comprises a housing 10 in which a drive shaft 11 is mounted in a radial bearing 12. A bushing 14, coupled with the drive shaft 11 for joint rotation by means of a feather key 13, is mounted on the same drive shaft 11. The bushing 14 is freely adjustable in axial direction. A spring blade 15, having a descending characteristic curve (FIG. 3) and producing an axially directed force is mounted on the bushing 14. The spring blade 15 is supported, on the one hand, at the point 16 of the bushing 14 and, on the other hand, by an orbit ring 17 of the inner sun 17, 17a.

Figure 2:
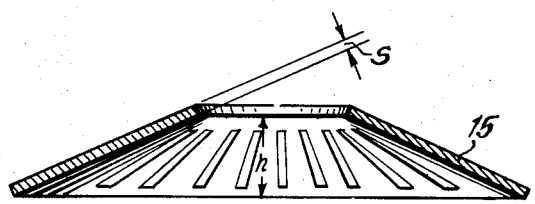
FIG. 2 is a sectional view of the spring blade used in the gear drive disclosed in FIG. 1.

FIG. 2 illustrates a spring blade 15 which can be used in the drive of FIG. 1, the reference characters $h$ and $s$ respectively denoting the height and wall thickness of the blade. The ratio $h/s$ is greater, according to the present invention, than $\sqrt{2}$.

During mounting of the spring 15 the ascending portion 18 of its characteristic curve is removed by pre-tensioning of the spring blade so that its working area starts only at the summit 19 of the curve and continues along the descending portion 20 of the characteristic curve, whereby the effect of the present invention is achieved.

Figure 3:
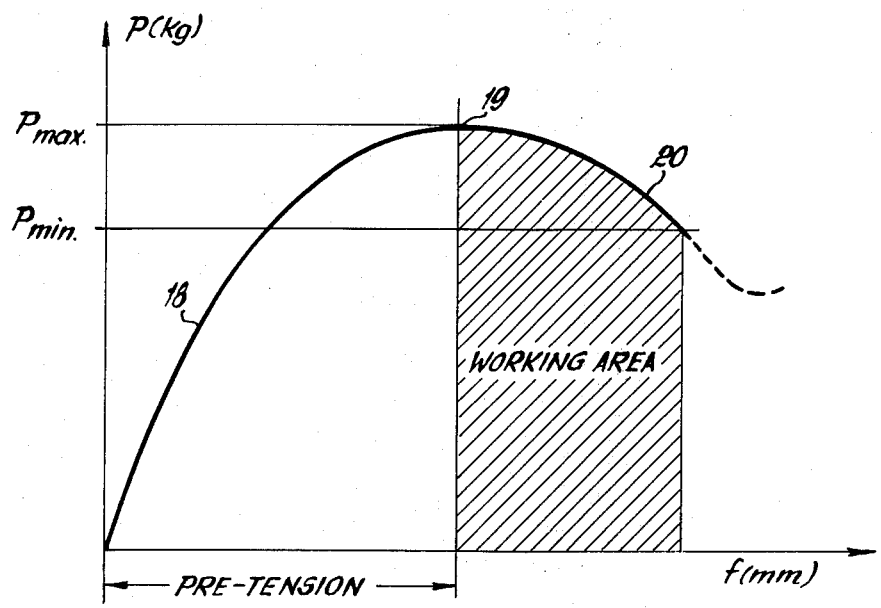
FIG. 3 depicts the characteristic curve of the spring blade.

In FIG. 3, the pre-tensioning of the spring 15 is plotted on the abscissa or $x$-axis of a coordinate graph, the spring path $f$ being expressed in millimeters. The ordinate or $y$-axis represents varying values of the spring force P, in kilograms. The shaded working area of the spring 15 lies between the $P_{min}$ and $P_{max}$ values, as explained in the preceding paragraph. The ratio of the highest to the lowest force is preferably about 1.4:1.

The planet gears 21 are in engagement with the inner rings 17, 17a, as well as with the outer rings 22, 22a, of which the outer ring 22 is rigidly secured to the housing 10, while the other outer ring 22a is adjustable relative to the immovable ring 22, for instance, by a bolt 23 which is guided in a slot 32 of an adjustment nut 33, the latter and, thereby, the ring 22a being displaced by a spindle 34 extending through the adjustment nut. Between the outer adjustable ring 22a and the housing 10 is disposed a moment coupling 24 which operates here practically like a roller mounted thread.

The planet gears 21 have on one side or, under circumstances, on both sides, a bearing pin 25, which is mounted in a sliding bushing 26 which in turn is supported in slots 27 of a driven disk 30 coupled for joint rotation with a driven shaft 28, for instance, by means of a key 29 or the like. The change of the number of revolutions is brought about herein by radial adjustment of the planet gears 21, which is achieved by the change of the distance between the outer rings 22 and 22a.

The closed system of mechanical force transmission is arranged in this drive in the following manner:

The coupling bushing 14 is driven at first by the driving shaft 11 of the drive, coupling bushing 14 being keyed to the driving shaft 11. The driving force is then transmitted by the feather key 31 to the inner rings 17, 17a of the inner sun. Finally, the peripheral force is transmitted from the inner sun to the driven disk 30 by means of the bearing pins 25 of the radially adjustable planet gears 21 which are in engagement with the inner rings 17, 17a, as well as with the outer rings 22, 22a. The driven disk 30 is keyed for joint rotation with the driven shaft 28.

In addition it should be emphasized that the shown and described embodiment of the present invention constitutes merely an example of the realization of the present invention and is not limited thereto. Rather, within the scope of the present invention other embodiments and other applications are possible. This relates to the number and the design of the springs, which, under circumstances, and if spring blades are used, may be arranged as a spring package.

In this connection it would not be excluded to use spring blades with radial slots, as shown in FIG. 2, these spring blades also having a descending characteristic curve.

While I have disclosed one embodiment of the present invention, it is to be understood that this embodiment is given by example only and not in a limiting sense, the scope of the present invention being determined by the objects and the claims.

I claim:

1. A continuously controllable friction wheel gear drive, comprising
   a housing,
   a drive shaft and a driven shaft,
   at least two inner gear rings rotated by said drive shaft,
   coupling means disposed between said drive shaft and said inner gear rings,
   at least two outer gear rings,
   one of said outer gear rings being immovably secured to said housing and the other of said outer gear rings being adjustable with respect to said one of said outer gear rings,
   a driven disk coupled with said driven shaft, and
   flat, double-conical planet gears mounted in said driven disk for adjustment in radial direction, and engaging both said inner gear rings and said outer gear rings,
   said coupling means including at least one pre-tensioned spring frictionally engaging one of said inner gear rings and having a descending characteristic curve in order to provide a working area of said spring, starting substantially at the summit of said characteristic curve of said spring and descending therefrom.

2. The gear drive, as set forth in claim 1, wherein
   said spring comprises at least one cup-shaped spring blade, and
   the ratio of the height of the cup formed by said spring blade to its wall thickness is greater than the square root of 2 ($h/s > \sqrt{2}$).

3. The gear drive, as set forth in claim 2, wherein said spring blade has radial slots.

4. The gear drive, as set forth in claim 1, wherein the ratio of the greatest to the smallest forces exerted by said spring within said working area is about 1.4:1.

References Cited by the Examiner

UNITED STATES PATENTS

| | | | |
|---|---|---|---|
| 2,563,895 | 8/51 | Wildhaber | 74—208 |
| 3,060,759 | 10/62 | Van Der Brugghen | 74—230.17 |
| 3,089,350 | 5/63 | Kirschey | 74—796 |

FOREIGN PATENTS

| | | |
|---|---|---|
| 446,140 | 3/23 | Germany. |

DON A. WAITE, *Primary Examiner.*